United States Patent [19]
Frean

[11] Patent Number: 5,557,729
[45] Date of Patent: Sep. 17, 1996

[54] APPLICATION DESIGN INTERFACE ENHANCEMENT

[75] Inventor: Charles A. Frean, Groton, Mass.

[73] Assignee: Digital Equipment Corporation, Maynard, Mass.

[21] Appl. No.: 874,750

[22] Filed: Apr. 27, 1992

Related U.S. Application Data

[63] Continuation-in-part of Ser. No. 428,583, Oct. 30, 1989, abandoned.

[51] Int. Cl.$^6$ .................................................. G06T 1/00
[52] U.S. Cl. .................................................. 395/158
[58] Field of Search ........................... 395/155, 161, 395/156, 157, 158, 160; 345/113, 114, 119, 120

[56] References Cited

U.S. PATENT DOCUMENTS 4,761,642  8/1988  Huntzinger .................... 345/120

FOREIGN PATENT DOCUMENTS 0322332  11/1988  European Pat. Off. .
63-20524  1/1988  Japan .
1267725  10/1989  Japan .

OTHER PUBLICATIONS

Data Sheet, Macintosh System Software Version 7.0, Apr. 1991.
Microsoft Excel V.3.0 1990, 1991, pp. 22–23.
Microsoft Windows 3.0 Users Guide, pp. 70–74 and 476–477, 1990.

*Primary Examiner*—Almis R. Jankus
*Assistant Examiner*—Joseph H. Feild
*Attorney, Agent, or Firm*—Arnold, White & Durkee

[57] ABSTRACT

A method of displaying windows corresponding to a plurality of applications, each application having at least one corresponding window, and one application currently running on a data processing system. The method controls display of windows by selectively changing between displaying the windows corresponding to their respective applications running on the data processing system and displaying only the windows of the one applications currently running on the data processing system. This method provides an enhancement to interface architecture for application design by providing a blank background feature to mask windows of all but the current application displayed on a data processing system screen when invoked by the user.

12 Claims, 1 Drawing Sheet

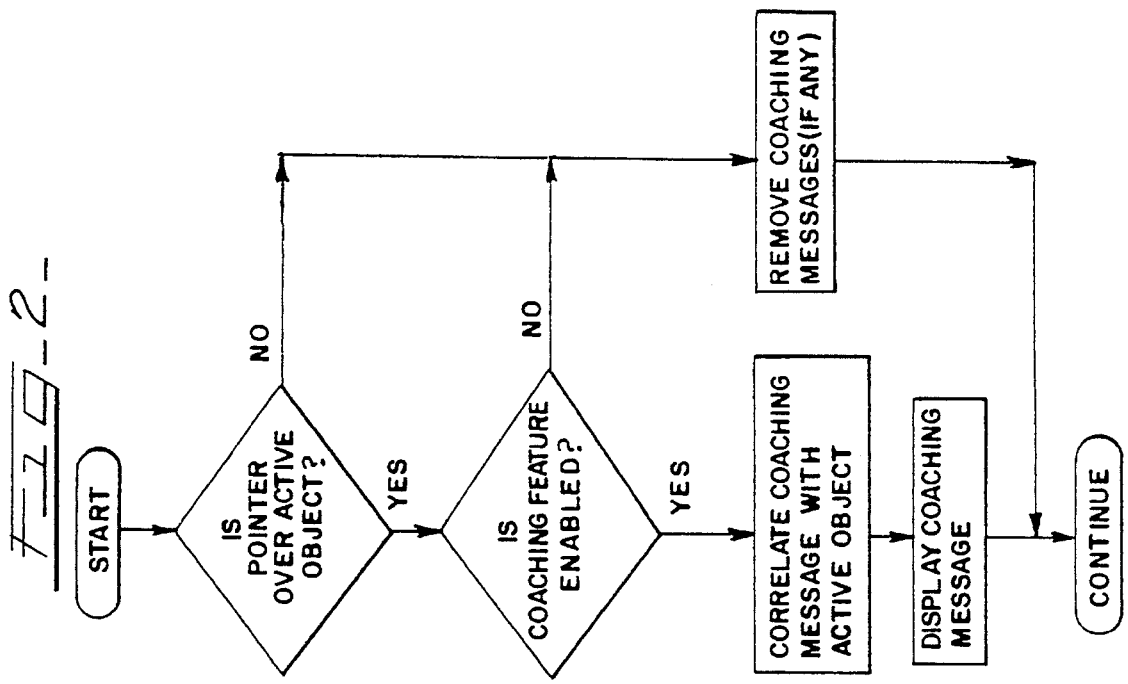

APPLICATION DESIGN INTERFACE ENHANCEMENT

RELATED APPLICATIONS

This application is a continuation-in-part application of U.S. application of Charles A. Frean titled "Application Design Interface Enhancement," Ser. No. 428,583 filed Oct. 30, 1989, now abandoned.

FIELD OF THE INVENTION

The present invention relates to interface architecture for use in application design, and more specifically to enhancements or improvements in interface architecture for providing application design aids on a computer system workstation.

BACKGROUND OF THE INVENTION

It is well known to distribute data processing applications across multiple operating systems with a variety of operating system platforms with appropriate interactive interface architecture. For instance, such interface architecture may be used to access applications from multiple operating systems. The architecture supports distributed applications on different hardware and operating system platforms while providing the building blocks for creating a graphic user interface and promoting open systems. The architecture accomplishes this through a server, a client, and the protocol that connects them. The server runs on the hardware in which the display and keyboard are located, providing low-level graphics, windowing, and user input functions. An example of such architecture is DECwindows™ Desktop Environment architecture. The client is an application that uses the facilities of a server. The client communicates through a protocol interface that is independent of the operating system and the network transport technology. Because the hardware and dependent graphics are performed with the server, applications are very portable across hardware and operating system platforms.

In such interactive data processing systems, as well as in other application design environments, it is desirable to be able to blank out all the windows of the applications that appear on the "desktop," or display, except for the windows of the application currently being run (e.g., the top most or current application). One way to accomplish this has been to iconify each window of the above applications and make the icon box window, which is non-iconifiable, as small as possible so that it is obscured by a window belonging to the application that is to be displayed. In such a system, when it is necessary to switch to another application, it is necessary to enlarge the icon box window in order to access the icons for that application and then de-iconify each of its windows. This is a very laborious process.

Another approach employs programming to create the illusion of a deep stack of windows, with only those at the very top actually visible. Responsive to operator demand, the top layer of windows turn translucent and dissolve to reveal another layer of windows behind them, and this second layer of windows may in turn be dissolved to reveal still another layer of windows, thereby making it possible to browse through complex arrays of information in simulated three-dimensional space. However, this approach allows only a single layer of windows to be displayed at any time. It is not possible to choose between the windows of the current application being run and all of the other windows.

Still another approach is to provide an operator-controlled function to remove all windows except for those of the current application being run. However, the removed windows do not reappear until the corresponding application is reactivated. Also, displayed icons are not removed by this approach.

It is also desirable to provide a coaching function or feature to get assistance with a particular application feature. One commonly used way to provide the coaching function has been to use the help feature. This approach is disruptive because it requires a conscious interruption to the process work flow.

SUMMARY OF THE PRESENT INVENTION

The blanking out of all the windows on the display except for the windows of the application being run is referred to as the blank background feature. The blank background function is achieved by having a screen-sized blank, undecorated window that underlies all other windows of the current application being run. The blank window is selectively removed or restored by operator command. In this way, the windows of the current application are displayed, or the windows of the current application as well as all the other windows are displayed upon operator command. Since the windows from the other applications are only masked, not removed, these windows reappear upon operator command without the need to reactivate the other applications.

The coaching feature is achieved by displaying a single line of coaching in a message window whenever the user moves a pointer in the display over an active, or "hot," object in a current window. This coaching feature enables the operator to invite automatic coaching whenever it is appropriate. The operator can turn this feature off altogether so that it is only present when needed.

DESCRIPTION OF THE DRAWINGS

FIG. 1 is a block diagram representing the methodology of the blank background feature according to the present invention.

FIG. 2 is a block diagram representing the methodology of the coaching feature according to the present invention.

DETAILED DESCRIPTION OF THE INVENTION

The blank background feature is initiated in the data processing system with an invocation command which is initiated from a programmed pull-down menu or entry or an operator-initiated command key entry. When the invocation command is so made, a display screen-size, undecorated blank window is displayed behind the rearmost window of the current one of the applications that are running on the data processing system. This blank window obscures the windows of all the other applications that are running on the data processing system. This non-application program screen-size blank window is not output active in that it does not ever display any output from the data processing system. The blank window is maintained blank from initiation through termination.

The blank background feature is terminated by a termination command which is initiated by a programmed pull-down menu entry or an operator-initiated command key entry, just as for the invocation command described above, as well as by a "click" entry of a "mouse" positioning the display cursor in the blank window on the display for the data processing system. When the termination command is so made, the blank window is removed, thereby revealing all the windows of the applications running on the data processing system that were masked by the blank window. Thus, it is clear that the screen-size blank window is initiated in the data processing system with an invocation command, maintained blank as long as it is displayed, and is removed with a termination command. A block diagram representing the methodology of the blank background feature according to the present invention as described above is shown in FIG. 1.

The blank background feature is easily added to interface architecture for application design using well known programming techniques with any code of choice, as will be appreciated by those skilled in the art. For example, one suitable program for implementing the blank background feature in SuperTalk™ code for the SuperCard™ architecture supplied by Silicon Beach Software, Inc., 9770 Carroll Center Road, Suite J, San Diego, Calif. 92126, is as follows:

```
Script excerpted from Project script, setting up for "Blank
Background" feature:
        open wd "Blank Screen"
        set the checkMark of item "Blank background"
        of menu
            "Preferences" to true
Script of "Blank Background" item in the "Preferences" menu:
on itemSelect
        global did_main_proj
        lock screen
        if the checkMark of me is true then -- item "Blank
        background' of menu "Preferences"
            close wd "Blank Screen" of project did_main_proj
            set the checkMark of me to false
        else
            open wd "Blank Screen" of project did_main_proj
            open wd "DW Main" of project did_main_proj
            set the checkMark of me to true
        end if
end itemSelect
Script of the "Blank Background" window object:
on update Window
        if the checkmark of item "Bank background" of menu
        "Preferences" is true then
            if "Blank Screen" is in top Windows() then
                close this wd
                set the checkmark of item "Blank background" of menu
                "Preferences" to false
            end if
        else
            set the checkmark of item "Blank background" of menu
            "Preferences" to true
        end if
end update Window
```

Thus, any message sent to the window object triggers this script and the blank window is closed or removed according to line 28, page 6. This program is easily adapted to the DECwindows™ Desktop Environment architecture, as will be appreciated by those skilled in the art.

The coaching feature operates by determining if the display cursor is over an active, or "hot," object on the display. An active object is an object for which there is a coaching message defined. If it is not, any displayed coaching message is removed from the display. If the cursor or pointer is over an active object, enablement of the coaching feature is determined. The coaching feature continuously displays at least one of said coaching messages corresponding to the active one of the objects selected by a new position of the display pointer until the coaching feature is disabled or the pointer is no longer over an active object. Thus, the coaching message is removed when the pointer moves over an area of the screen for which there is no coaching message.

The coaching feature is enabled in the same way as for the blank background feature described above, that is, by a programmed pull-down menu entry or an operator-initiated command key entry. If the coaching feature is enabled, then one of the coaching messages corresponding to the active object under the cursor is determined and displayed. A block diagram representing the methodology of the coaching feature according to the present invention as described above is shown in FIG. 2.

The coaching feature is also easily added to interface architecture for application design using well known programming techniques with any code of choice, as will be appreciated by those skilled in the art. For example, one suitable program for implementing the coaching feature in SuperTalk™ code for the SuperCard™ architecture is as follows:

```
Script excerpted from Project script, setting up for "Coaching"
feature:
        global hush_
        put "hush" into hush_ -- to inhibit coaching
        set the checkMark of menu item "Coaching" of menu
            "Help" to false
Script of "Coaching" item in the "Help" menu:
on itemSelect
        global hush
        if hush_is "coach" then
            put "hush" into hush_
            set the checkMark of item 4 of menu "Help" to
            false --
        else
            put "coach" into hush_
            set the checkMark of item 4 of menu "Help" to true
        end if
end itemSelect
Script of a typical object for which "Coaching" is available:
        on mouseEnter
            global hush
            if hush_is "coach" then -- display the Coaching
            message
                put "Shift/mouse to move; Option/mouse to edit;
                Mouse to view"
            end if
        end mouseEnter
        on mouseLeave
            global hush_
            if hush_is "coach" then put"" -- clear out any
            Coaching message
        end mouseLeave
```

This program is easily adapted to the DECwindows™ Desktop Environment architecture, as will be appreciated by those skilled in the art.

Thus, there has been described herein programming enhancements or improvements to interface architecture for application design that allow selective masking of display windows not included in a current application being run and automatic coaching message displays corresponding to active window objects selected on the display. It will be understood that various changes in the details and arrangement of the processes that have been herein described and illustrated in order to explain the nature of the invention may be made by those skilled in the art within the principle and scope of the present invention as expressed in the appended claims.

What is claimed is:

1. In a data processing system having a plurality of active applications, and a display, each of said active applications having at least one window, said active applications including one currently running application, a method of controlling display of said windows on said display of said data processing system by selectively changing between obscuring and revealing all of said windows except said at least one window of said one currenly running application, comprising the steps of:

displaying, in response to a first command, a non-application program full screen-size blank window that obscures all of said windows at said at least one window of said currently running application, said blank window residing behind a rearmost window of said currently running application, regardless of the size of said at least one window of said currently running application; and revealing, in response to a second command, all of said previously obscured windows by removing in a single user action said non-application program full screen-size blank window from behind said rearmost window of said currently running application.

2. The method recited in claim 1, further comprising the step of initiating said first command by a pull-down menu entry programmed in said data processing system.

3. The method recited in claim 1, further comprising the step of initiating said first command by a command key entry in said data processing system.

4. The method recited in claim 1, further comprising the step of initiating said second command by a pull-down menu entry programmed in said data processing system.

5. The method recited in claim 1, further comprising the step of initiating said second command by a command key entry in said data processing system.

6. The method recited in claim 1, further comprising the step of initiating said second command by a "click" entry of a "mouse" positioning a display cursor in said blank window.

7. In a data processing system having a plurality of active applications, and a display, each of said active applications having at least one window, said active applications including one currently running application, a method of controlling display of said windows on said display of said data processing system by selectively changing between obscuring and revealing all of said windows except said at least one window of said one currently running application comprising the steps of:

receiving a first command to obscure all of said windows but said at least one window of said currently running application;

displaying, in response to said first command, a non-application program full screen-size blank window that obscures all of said windows but said at least one window of said currently running application, said blank window residing behind a rearmost window of said currently running application, regardless of the size of said at least one window of said currently running application; and receiving a second command to reveal all of said previously obscured windows on said display; and removing, in response to said second command, said non-application program full screen-size blank window from behind said rearmost window of said currently running application.

8. The method recited in claim 7, further comprising the step of initiating said first command by a pull-down menu entry programmed in said data processing system.

9. The method recited in claim 7, further comprising the step of initiating said first command by a command key entry on said data processing system.

10. The method recited in claim 7, further comprising the step of initiating said second command by a pull-down menu entry programmed in said data processing system.

11. The method recited in claim 7, further comprising the step of initiating said second command by a command key entry in said data processing system.

12. The method recited in claim 7, further comprising the step of initiating said second command by a "click" entry of a "mouse" positioning a display cursor in said blank window.

\* \* \* \* \*